L. B. SUTTON.
Cotton Seed-Planters.
No. 136,342. 
Patented Feb. 25, 1873.
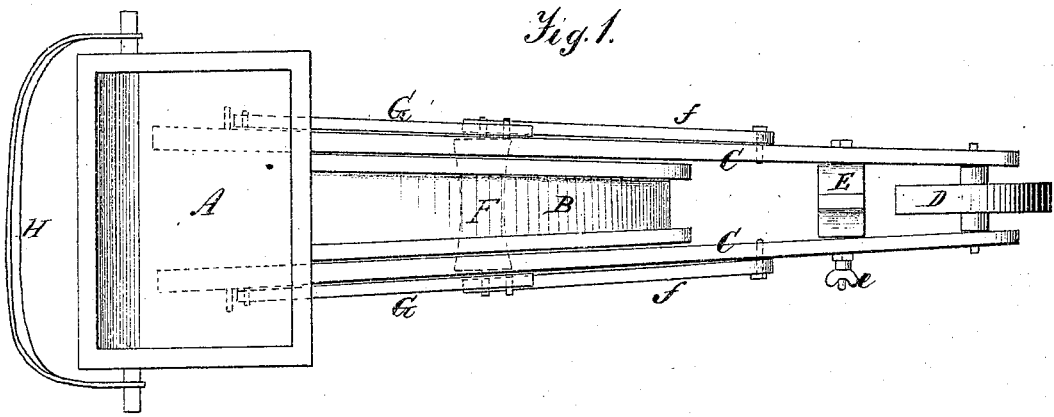
Fig. 1.
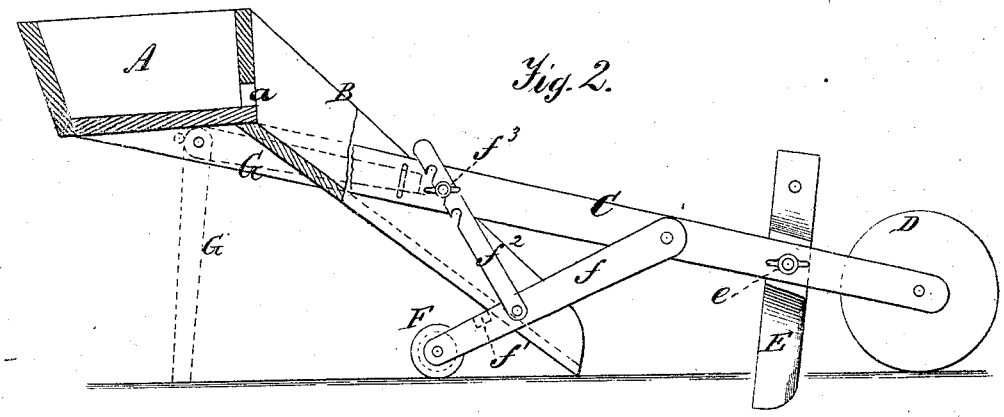
Fig. 2.
Fig. 3.
Witnesses.
A. Ruppert.
William Lynch
Inventor.
Lewis B. Sutton
Edson Brothers
Attys.

UNITED STATES PATENT OFFICE.

LEWIS B. SUTTON, OF WINDSOR, NORTH CAROLINA.

IMPROVEMENT IN COTTON-SEED PLANTERS.

Specification forming part of Letters Patent No. 136,342, dated February 25, 1873.

*To all whom it may concern:*

Be it known that I, LEWIS B. SUTTON, residing in Windsor, county of Bertie and State of North Carolina, have invented a new and useful Improvement in Cotton-Seed Planters, of which the following is a specification:

In the annexed drawing, Figure 1 represents a plan view of my improved cotton-seed planter. Fig. 2 is a view thereof partly in section and partly in side view, and Fig. 3 a front view of the opener.

In the several figures corresponding parts are designated by similar letters.

This invention has reference to an improved cotton-seed planter; and it consists of the combination, with a seed-receptacle, of a trough, means for supporting and transporting the same, an opener, and a roller or coverer, all substantially as and for the purpose hereinafter set forth, and specifically pointed out in the claim.

To enable others to make and use my invention, I will proceed to describe its construction and operation.

A in the accompanying drawing refers to the cotton-seed receptacle, which is an ordinary box having an aperture or hole, $a$, for the escape of said seed therefrom. B refers to a trough, which is attached to the receptacle by any desired means in an inclined plane, as plainly shown in Fig. 2, the upper end thereof communicating with the seed-opening $a$, and the lower end occupying a position contiguous to the seed-furrow, and is for the purpose of conducting the seed from the receptacle to the furrow. C C are two parallel inclined bars, which are fastened at their upper ends to the lower side of the receptacle, and embracing at and between their outer ends, by means of an axle, a wheel, D, the object of which is to form a depression or furrow in the plowed ground for the reception of the seed. E refers to the "opener," which is hung between the bars C C, and provided with a set-screw, $e$, for the purpose of securely holding it in any desired inclination.

This device, which is constructed substantially as shown in Fig. 3, is for the purpose of opening the furrow or making it deeper to insure the seed being properly deposited in the furrow.

F is the coverer or a roller, the periphery of which is provided with a concavity, and which is hung or journaled between the lower ends of the pendants $f\ f$, pivoted at their upper ends to the bars C C. The pendants $f\ f$ are provided, at a point just above the roller F, with a stop or bar, $f^1$, which prevents contact between the said roller and the seed-trough while the machine is in motion. $f^2\ f^2$ refer to two bars pivoted, at their lower ends, to the pendants $f\ f$, and supplied with a number of notches or openings, into which fit thumb-screws $f^3\ f^3$, entering the bars C C, the object of which being to permit of the roller or coverer F being adjusted to suit the depth of the furrow into which the wheel and opener enter.

This coverer is for the purpose of covering the furrow containing the seed.

I provide legs, G G, which are attached to the bars C directly under the receptacle A, for supporting the machine at its rear end when not in use. H is a band, which is suitably connected to the receptacle A of the machine, and is designed to be passed over the shoulders of the operator. The band H is to be made of some elastic material, whereby the operator, without in the least bending himself or stooping, can readily and easily apply the desired amount of pressure to the machine which it is required to give to the coverer or roller in the proper performance of its work.

Instead of allowing the seeds to escape through the seed-aperture in the receptacle A, they can be taken up with the hand and put directly into the trough B, which, as already stated, conveys them to the ground, and by which process the same number of seed may be deposited during the operation of the machine in each furrow.

This machine is also adapted to the sowing of guano, the latter being placed in the receptacle A, and fed through the aperture $a$ in quantities to suit the quality or fertility and sterility of the ground—an advantage which does not appear to be possessed by machines used for that purpose.

Having thus fully described my invention, what I claim, and desire to secure by Letters Patent, is—

The receptacle A, trough B, bars C C, wheel D, opener E, coverer F $f f^2$, and band H, all combined and arranged substantially as and for the purpose set forth.

In testimony whereof I have hereunto signed my name this 28th day of May, A. D. 1872, in presence of two subscribing witnesses.

L. B. SUTTON.

Witnesses:
WM. P. GURLEY, Jr.,
W. M. DAVIS.